US006980782B1

(12) United States Patent
Braun et al.

(10) Patent No.: US 6,980,782 B1
(45) Date of Patent: Dec. 27, 2005

(54) ANTENNA DEVICE AND METHOD FOR TRANSMITTING AND RECEIVING RADIO WAVES

(75) Inventors: Christian Braun, Stockholm (SE); Olov Edvardsson, Täby (SE); Leif Eriksson, Norrtälje (SE)

(73) Assignee: AMC Centurion AB, Akersberga (SE)

( * ) Notice: Subject to any disclaimer, the term of this patent is extended or adjusted under 35 U.S.C. 154(b) by 916 days.

(21) Appl. No.: 09/712,181

(22) Filed: Nov. 15, 2000

Related U.S. Application Data

(63) Continuation of application No. PCT/SE00/02057, filed on Oct. 24, 2000.

(30) Foreign Application Priority Data

Oct. 29, 1999 (SE) ............................................ 9903944

(51) Int. Cl.[7] ........................... H04B 1/06; H04B 7/00; H04B 1/04; H04B 10/00; H01Q 11/12

(52) U.S. Cl. ............................... 455/277.2; 455/277.1; 455/121; 455/123; 455/575.7; 455/63.4; 455/67.11

(58) Field of Search ........................... 455/82, 84, 121, 455/123, 129, 269, 272, 277.1, 277.2, 67.11, 63.1, 63.4, 575.7

(56) References Cited

U.S. PATENT DOCUMENTS 3,693,088 A * 9/1972 Rustako et al. ............. 455/506
4,123,759 A 10/1978 Hines et al.
4,958,382 A 9/1990 Imanishi
5,243,358 A 9/1993 Sanford et al.
5,294,939 A * 3/1994 Sanford et al.
5,463,406 A 10/1995 Vannatta et al. ............ 343/725
5,471,146 A 11/1995 Krayeski et al.
5,486,836 A 1/1996 Kuffner et al.
5,530,926 A 6/1996 Rozanski ................. 455/277.2
5,541,614 A 7/1996 Lam et al. ............... 343/792.5
5,589,844 A * 12/1996 Belcher et al. ............. 343/860
5,617,102 A * 4/1997 Prater .......................... 342/374
5,680,142 A * 10/1997 Smith et al. ................ 342/372

(Continued)

FOREIGN PATENT DOCUMENTS

| | | |
|---|---|---|
| EP | 0546803 | 8/1992 |
| EP | 0840394 A2 | 6/1998 |
| EP | 0852407 | 8/1998 |
| GB | 2327572 | 1/1999 |
| GB | 2332124 | 9/1999 |
| JP | 10145130 | 5/1998 |
| JP | 10209932 A | 8/1998 |
| WO | WO 94/28595 | 12/1994 |
| WO | WO 99/44307 | 9/1999 |

*Primary Examiner*—Lee Nguyen
*Assistant Examiner*—Raymond Persino
(74) *Attorney, Agent, or Firm*—Volentine Francos & Whitt, PLLC

(57) ABSTRACT

An antenna device for transmitting and receiving radio frequency waves, installable in a communication device includes an antenna structure switchable between antenna configuration states. Each state is distinguished by a set of radiation parameters, such as resonance frequency, input impedance, bandwidth, radiation pattern, gain, polarization, and near-field pattern. A switching device selectively switches the structure between the states. The antenna device includes a first receiver which receives a first measured operation parameter indicative of quality of transmission of radio frequency waves by the antenna structure, and a second receiver which receives a second measured operation parameter indicative of quality of reception of radio frequency waves by the structure. The antenna device includes a controller which controls the switching device, and selective switching of the antenna structure between the states, based on the first and second measured operation parameters, to improved transmission and/or reception quality.

43 Claims, 6 Drawing Sheets

U.S. PATENT DOCUMENTS

| | | | | | |
|---|---|---|---|---|---|
| 5,689,439 | A | | 11/1997 | Weerackody et al. | |
| 5,710,995 | A | * | 1/1998 | Akaiwa et al. | 455/277.2 |
| 5,754,104 | A | * | 5/1998 | Saito | 340/539.1 |
| 5,777,581 | A | | 7/1998 | Lilly et al. | |
| 5,794,145 | A | | 8/1998 | Milam | |
| 5,920,809 | A | | 7/1999 | Clarke | 455/272 |
| 5,933,122 | A | | 8/1999 | Sauer et al. | |
| 5,991,643 | A | * | 11/1999 | Chao-Cheng | 455/575.7 |
| 6,021,317 | A | * | 2/2000 | Irvin | 455/78 |
| 6,034,638 | A | | 3/2000 | Thiel et al. | |
| 6,046,697 | A | * | 4/2000 | Overbury et al. | 342/360 |
| 6,118,409 | A | | 9/2000 | Pietsch et al. | |
| 6,297,780 | B1 | * | 10/2001 | Kirisawa | 343/703 |
| 6,370,369 | B1 | | 4/2002 | Kraiem et al. | |
| 6,392,610 | B1 | | 5/2002 | Braun et al. | |

* cited by examiner

N states,
State i, i=1, set threshold

ANTENNA DEVICE AND METHOD FOR TRANSMITTING AND RECEIVING RADIO WAVES

CROSS REFERENCE TO RELATED APPLICATIONS

The present invention claims priority to commonly assigned Swedish Patent Application Serial No 9903944-8 filed Oct. 29, 1999 and is a continuation of PCT Patent Application Serial No. PCT/SE00/02057 filed on Oct. 24, 2000, the entire contents of all of which are hereby incorporated by reference in their entirety for all purposes. The present application is also related to commonly assigned, co-pending U.S. patent application Ser. No. 09/712,131 entitled "An antenna device for transmitting and/or receiving RF waves", now U.S. Pat. No. 6,392,610; U.S. patent application Ser. No. 09/712,144 entitled "Antenna device for transmitting and/or receiving radio frequency waves and method related thereto"; and U.S. patent application Ser. No. 09/712,133 entitled "Antenna device and method for transmitting and receiving radio waves", all of which were filed concurrently herewith. These applications are based on the following corresponding PCT applications: PCT/SE00/02058; PCT/SE00/02059; and PCT/SE00/02056, respectively, all filed on Oct. 24, 2000, the entire contents of which are hereby incorporated by reference in their entirety for all purposes.

TECHNICAL FIELD OF THE INVENTION

The present invention relates generally to an antenna device, a radio communication device including the antenna device, and a method for transmitting and receiving electromagnetic waves. More particularly, the present invention is related to an antenna device that is adaptable to a variety of conditions.

BACKGROUND OF THE INVENTION

In modern communication systems, there is an ever-increasing demand for smaller and more versatile portable terminals, e.g., hand-portable telephones. It is well known that the size of an antenna is a critical factor for its performance. Further, the interaction between antenna, telephone body and proximate environment, e.g., the user, will become more important than ever. Recently, there is also normally a requirement that two or more frequency bands be supported. It is thus a formidable task to manufacture such compact and versatile terminals, which exhibit good antenna performance under a variety of conditions.

Current manufacturing of a hand-portable telephone commonly adapts the antenna to the characteristics of this specific telephone and to be suited for a default use in a default environment. This means that the antenna cannot later on be adapted to any specific condition under which a certain telephone is to be used or to suit a different hand-portable telephone. Thus, each model of a hand-portable telephone must be provided with a specifically designed antenna, which normally cannot be optimally used in any other telephone model.

The radiating properties of an antenna device for a hand-held wireless communication device depends heavily on the shape and size of the support structure such as a printed circuit board (PCB) of the device and of the telephone casing. All radiation properties, such as resonance frequency, input impedance, bandwidth, radiation pattern, gain, polarization, and near-field pattern are a product of the antenna device itself and its interaction with the PCB and the telephone casing. Thus, all references to radiation properties made below are intended to be for the whole device in which the antenna is incorporated.

What has been stated above is true also with respect to other radio communication devices, such as cordless telephones, telemetry systems, wireless data terminals, etc. Thus, the antenna device of the invention is applicable on a broad scale in various communication devices.

Receiving antennas, with diversity functionality, which can adapt to various radio wave environments, are known. Such diversity functionality systems may be used to suppress noise, and/or undesired signals such as delayed signals, which may cause inter-symbol interference, and co-channel interfering signals, and thus improve the signal quality. However, these diversity functioning antennas require complex receiver circuitry structure, including multiple receiver chains, and a plurality of antenna input ports.

Switchable antennas are known in the literature for achieving diversity. In such switchable antennas, certain characteristics of the antenna system can be varied by connecting/disconnecting segments of the dipole arms to make them longer or shorter, for instance.

However, none of the above arrangements provide any switchable antenna elements that are connected or disconnected on some intelligent basis, e.g. when needed due to signal conditions.

SUMMARY OF THE INVENTION

The present invention is therefore directed to an antenna device, a communication device including the antenna device and a method of receiving and transmitting electromagnetic waves that substantially overcomes one or more of the problems due to the limitations and disadvantages noted above.

It is a further object of the invention to provide an antenna device, which can be adapted in order to suit different models of communication devices, after the antenna device has been installed therein.

It is another object of the invention to provide an antenna device of which certain characteristics are controllable, such as resonance frequency, input impedance, bandwidth, radiation pattern, gain, polarization, and near-field pattern, and diversity.

It is an additional object of the invention to provide an antenna device, which exhibits a controllable interaction between its antenna structure and switching device.

It is still a further object to provide an antenna device that is simple, lightweight, easy to manufacture and inexpensive.

It is yet a further object to provide an antenna device being efficient, easy to install and reliable, particularly mechanically durable, even after long use.

It is still a further object of the invention to provide an antenna device suited to be used as an integrated part of a radio communication device.

These objects among others may be realized by providing an antenna device for transmitting and receiving electromagnetic waves, connectable to a communication device, including transmitter and receiver sections. The receiver section includes an antenna structure switchable between a plurality of antenna configuration states. Each of antenna configuration states is distinguished by a set of radiation related parameters, such as resonance frequency, input impedance, bandwidth, radiation pattern, gain, polarization, and near-field pattern. A switching device selectively switches the antenna structure between the plurality of antenna configuration states. Thus, the antenna device is versatile and adaptable to various conditions and suitable for obtaining desired functions.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description of embodiments of the present invention given hereinbelow and the accompanying FIGS. 1–7*f*, which are given by way of illustration only, and thus are not limitative of the invention.

DETAILED DESCRIPTION OF PREFERRED EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known devices and methods are omitted so as not to obscure the description of the present invention with unnecessary details.

As used herein, the expression “antenna structure” is intended to include active elements connected to the transmission (feed) line(s) of the radio communication device circuitry, as well as elements that can be grounded or left disconnected, and hence operate as, e.g., directors, reflectors, impedance matching elements.

Figure 1:
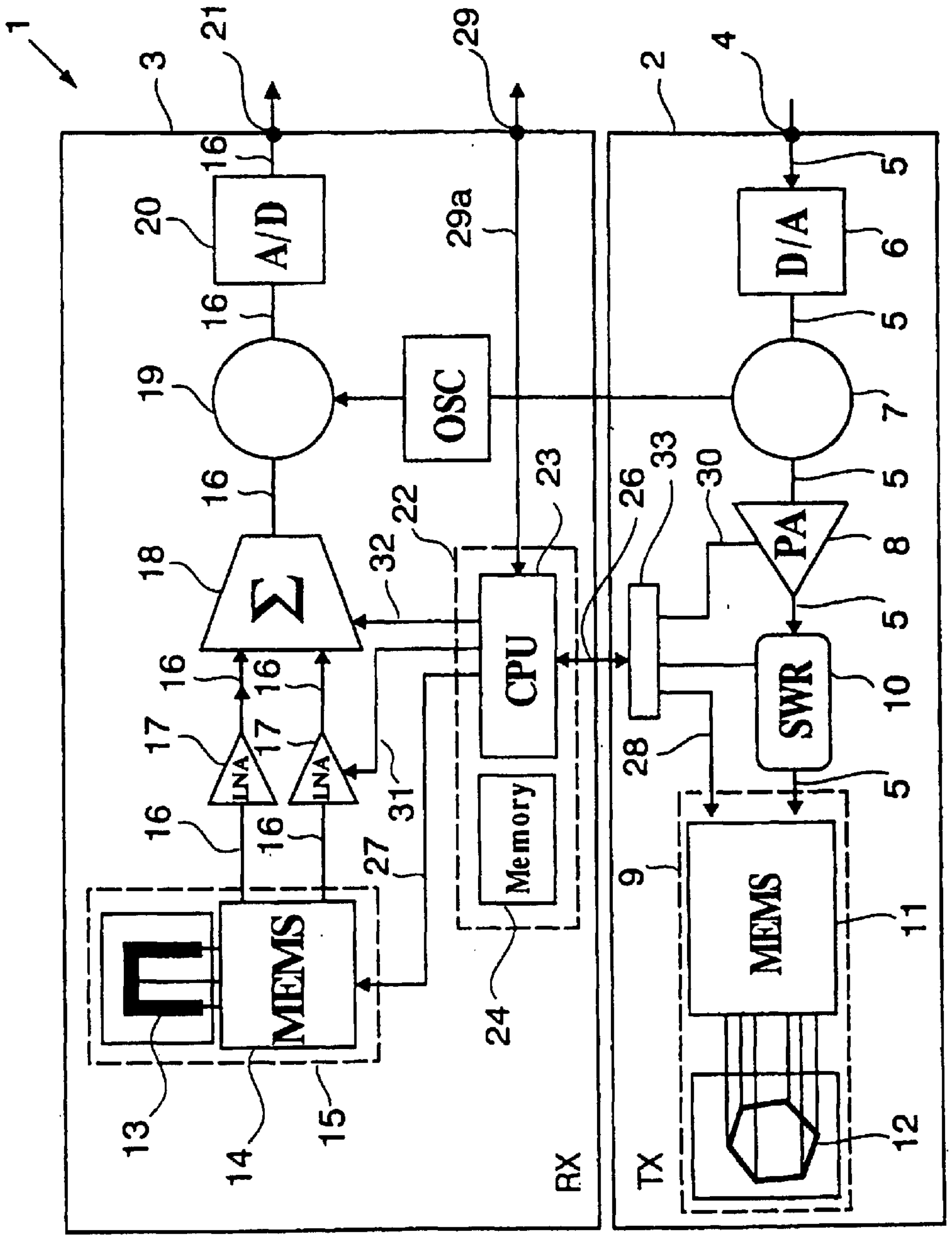
FIG. 1 schematically illustrates a block diagram of an antenna module for transmitting and receiving radio waves according to an embodiment of the present invention.

Inventive Antenna Module (FIG. 1)

With reference to FIG. 1 an antenna device or module 1 according to an embodiment of the present invention includes separate transmitter (TX) 2 and receiver (RX) 3 RF sections.

Antenna module 1 is the high frequency (HF) part of a radio communication device (not shown) for transmitting and receiving radio waves. Thus, antenna module 1 is preferably arranged to be electrically connected, via communications circuitry, to a digital or analog signal processor of the communication device.

Antenna module 1 is preferably arranged on a carrier (not shown), which may be a flexible substrate, a molded interconnection device (MID) or a printed circuit board (PCB). Such an antenna module PCB may either be mounted, particularly releasably mounted, together with a PCB of the communication device side by side in substantially the same plane or it may be attached to a dielectric support mounted, e.g., on the radio device PCB such that it is substantially parallel with it, but elevated therefrom. The antenna module PCB can also be substantially perpendicular to the PCB of the communication device.

Transmitter section 2 includes an input 4 for receiving a digital signal from a digital transmitting source of the communication device. Input 4 is via a transmission line 5 connected to a digital to analog (D/A) converter 6 for converting the digital signal to an analog signal. Converter 6 is connected, via transmission line 5, to an upconverter 7 for upconverting the frequency of the analog signal to the desired RF frequency. Upconverter 7 is in turn connected, via the transmission line 5, to a power amplifier (PA) 8 that amplifies the frequency converted signal. Power amplifier 8 is further connected to a transmitter antenna device 9 that transfers the amplified RF signal and radiates RF waves in accordance with the signal. A filter (not shown) may be arranged in the signal path before or after the power amplifier.

A device 10 for measuring a reflection coefficient, e.g., voltage standing wave ratio (VSWR), in the transmitter section 2 is connected in transmitter section 3, preferably as shown in FIG. 1 between the power amplifier 8 and the transmitter antenna device 9, or incorporated in transmitter antenna device 9.

The transmitter antenna device 9 includes a switching device 11 connected to the transmission line 5 and a transmitting antenna structure 12, which is switchable between a plurality of (at least two) antenna configuration states. Each antenna configuration state is distinguished by a set of radiation related parameters, such as resonance frequency, input impedance, bandwidth, radiation pattern, gain, polarization, and near-field pattern.

The receiver section 3 includes a receiving antenna structure 13 for receiving RF waves and for generating an RF signal in dependence thereof. The receiving antenna structure 13 is switchable between a plurality of (at least two) antenna configuration states. Each antenna configuration state is distinguished by a set of radiation related parameters, such as resonance frequency, input impedance, bandwidth, radiation pattern, gain, polarization, and near-field pattern. A switching device 14 is arranged in proximity thereof for selectively switching the antenna structure 13 between the antenna configuration states. The receiving antenna structure 13 and the switching device 14 may be arranged integrally in a receiver antenna device 15.

Antenna structures 12 and 13 may include a plurality of elements connectable to transmission lines 5 and 16, respectively, or to ground (not shown) and/or include a plurality of spaced points of connection connectable to respective transmission lines 5 and 16 or to ground, respectively, which will be-described further below.

The antenna structure 13 is further connected, via the transmission line 16, to one or several low noise amplifiers (LNA) 17 for amplifying the received signal. The RF feeding of antenna structure 13 can be achieved via the switching device 14 as in the illustrated case, or can be achieved separately, outside of the switching device 14.

If reception diversity is used, the signals output from the low noise amplifiers 17 are combined in a combiner 18. The diversity combining can be of switching type, or be a weighted summation of the signals.

The transmission line 16 is further connected to a downconverter or downmixer 19 for downconverting the frequency of the signal and to an analog to digital (A/D) converter 20 for converting the received signal to a digital signal. The digital signal is output at 21 to digital processing circuitry of the communication device.

According to the invention, a control device 22 receives a first measured operation parameter indicative of the quality of transmission of radio frequency waves by antenna module 1 and a second measured operation parameter indicative of the quality of reception of radio frequency waves by antenna module 1. The control device 22 controls either the switching device 11 or switching device 14, or both. Thus, the control device 22 realizes the selective connecting and disconnecting of parts of antenna structures 12 or/and 13, in dependence on the received first and second measured operation parameters in order to improve the quality of the transmission or/and the reception.

The first measured operation parameter is preferably a measure representing the reflection coefficient, e.g., voltage standing wave ratio (VSWR), as measured by the device 10 at transmitter section 2. Alternatively, the first measured operation parameter may be a measure of the quality of a transmitted channel, which may be measured at a receiving base station and reported back to the communication device. The second measured operation parameter is preferably indicative of the quality of reception of radio frequency waves, e.g., bit error rate (BER), carrier-to-noise (C/N) ratio or carrier-to-interference (C/I) ratio as measured by the communication device. Alternatively, the second parameter is a parameter measurable within the antenna module 1, such as received signal strength indicators (RSSI).

The switching device 11 or/and the switching device 14 easily controls the connection and disconnection of parts of antenna structures 12 or/and 13. By reconfiguring the antenna structures connected to the respective transmission lines, radiation related parameters such as resonance frequency, input impedance, bandwidth, radiation pattern, gain, polarization, and near-field pattern can be altered.

Preferably, at installation of antenna module 1 in a particular model of a radio communication device, the control device 22 is arranged for controlling the switching device 11 or/and the switching device 14 to switch state in dependence on the received first and second measured operation parameters, so as to adapt the antenna module to suit the model.

The operation parameters values are preferably received by the control device 22 repeatedly during use, by sampling at regular time intervals or continuously. Furthermore, during use of antenna module 1 in a communication device, the control device 22 is arranged for controlling the switching device 11 or/and the switching device 14 to switch antenna configuration states in accordance with the repeatedly received first and second measured operation parameters. Thus, the antenna module 1 may be dynamically adapted to objects in the close-by environment of the communication device. Hence, the performance of antenna module 1 may be continuously optimized during use.

The control device 22 preferably includes a central processing unit (CPU) 23 with a memory 24 connected to the measuring device 10 via connections 25, 26, to the switching device 11 via lines 26, 28, and to the switching device 14 via line 27. The CPU 23 is preferably provided with a suitable control algorithm and the memory 24 is used for storing various antenna configuration data for the switching. Switching device 11 and 14 preferably include a microelectromechanical system (MEMS) switch device. CPU 23 thus may receive measured VSWR values from the measuring device 10 through lines 25, 26, measured BER, (C/N) or (C/I) ratios from the digital radio communication device via a control port 29 and a control line 29*a*, and processes each received parameter value. When the CPU 23 determines, according to any implemented control algorithm, that the antenna configuration state should be altered, the CPU 23 sends switching instruction signals to the switching device 11 or/and the switching device 14.

Furthermore, a control port 29 of antenna module 1 is used for signaling between the CPU 23 and the digital circuitry of the communication device via line 29*a*. Hereby, power amplifier 8, low noise amplifiers 17, and combiner 18 may be controlled via lines 30, 31, and 32, respectively. In FIG. 1, finally, a parallel-serial converter 33 is arranged in the transmitter section 2 for converting parallel signaling lines 25, 28, 30 to a serial line 26. This conversion reduces the number of lines, and thus connections, between the transmitter section 2 and the receiver section 3. Optionally, CPU 23, memory 24 and control port 29 may be located in the transmitter section 2 and hence the parallel-serial converter 33 is arranged in receiver section 3 in order to attain the same object.

The antenna module 1 as illustrated in FIG. 1 has only digital ports (input 4, output 21, and control port 29) and thus, it may be referred to as a digital controlled antenna (DCA). However, it shall be appreciated that an antenna module according to the present invention does not necessarily have to include A/D and D/A converters, frequency converters or amplifiers. In any of these cases the antenna module will obviously have analog input and output ports.

Operation Environments

Next, various operation environments that may affect the performance of the antenna device or module in accordance with the invention will be described.

The antenna parameters, such as resonance frequency, input impedance, bandwidth, radiation pattern, gain, polarization, and near-field pattern of a small-sized wireless communication device are affected by objects in the proximity of the device. As used herein, proximity means the distance within which the effect on the antenna parameters is noticeable. This distance extends roughly to about one wavelength of radiation away from the device.

A small-sized wireless communication device, such as a mobile telephone, can be used in many different close-by environments. It can for example be held to the ear as a telephone, it can be put in a pocket, it can be attached to a belt at the waist, or it can be held in the hand. Further, it can be placed on a metal table. Many more operation environments may be enumerated. Common for all environments is that there may be objects in the proximity of the device affecting the antenna parameters of the device. Environments with different objects in the proximity of the device have different influence on the antenna parameters. Two specific operation parameters will in the following be specifically discussed.

The free space (FS) operation environment is obtained by locating the radio communication device in empty space, i.e., with no objects in the proximity of the device. Air surrounding the device is here considered free space. Many operation environments can be approximated by the free space environment. Generally, if the environment has little influence on the antenna parameters, it can be referred to as free space.

The talk position (TP) operation environment is defined as the position in which the radio communication device is held to the ear by a user. The influence on the antenna parameters varies depending on the person that is holding the device and on exactly how the device is positioned. Here, the TP environment is considered as a general case, i.e., covering all individual variations mentioned above.

Figure 2:
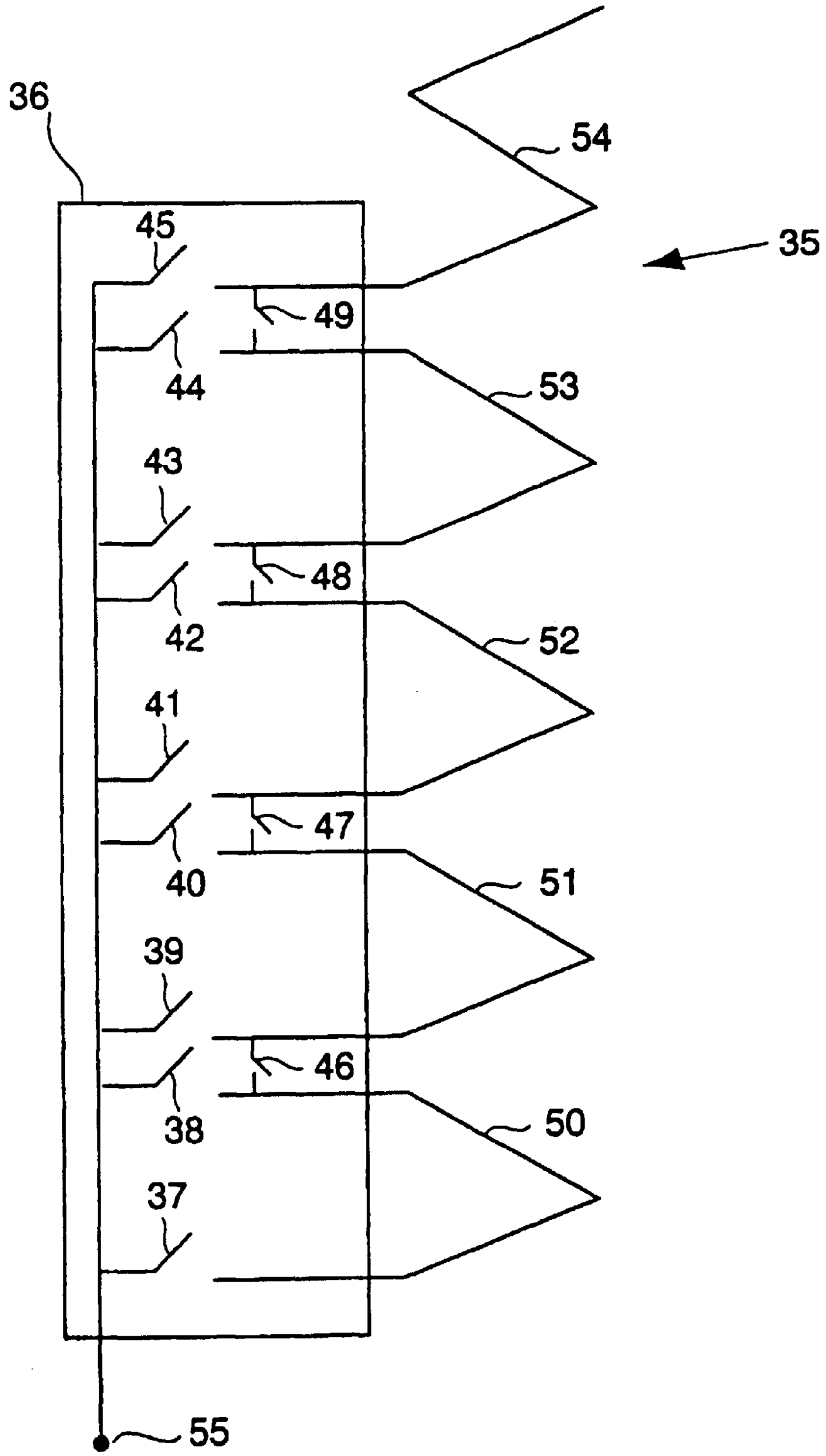
FIG. 2 schematically illustrates receiving or transmitting antenna elements and a switching device for selectively connecting and disconnecting the receiving antenna elements as part of an antenna module according to the present invention.

Resonance Frequency (FIG. 2)

Next, various radiation related parameters that may be controlled in accordance with the invention, such as resonance frequency, input impedance and radiation pattern, will be described in more detail.

Antennas for wireless communication devices experience detuning due to the presence of the user. For many antenna types, the resonance frequency drops a few percent when the user is present, compared to when the device is positioned in free space. An adaptive tuning between free space (FS) and talk position (TP) can reduce this problem substantially.

A straightforward way to tune an antenna is to alter its electrical length, and thereby altering the resonance frequency. The longer the electrical length, the lower the resonance frequency. This is also the most straightforward way to create band switching, if the change in electrical length is large enough.

In FIG. 2, a meander-like antenna structure 35 is arranged together with a switching device 36 including a plurality of switches 37–49. The antenna structure 35 may be seen as a plurality of aligned and individually connectable antenna elements 50–54, which, in a connected state, are connected to a feed point 55 through the switching device 36. The feed point 55 is further connected to a low noise amplifier of a receiver circuitry (not shown) of a communication device. Hence, the antenna structure 35 operates as a receiving antenna. The low noise amplifier may alternatively be located in an antenna module together with the antenna structure 35 and the switching device 36. Optionally, the feed point 55 is connected to a power amplifier of a communication transmitter for receiving an RF signal, the antenna structure 35 thereby operating as a transmitting antenna.

A typical example of operation is as follows. Assume that switches 37 and 46–49 are closed and remaining switches are opened and that such an antenna configuration state is adapted for optimal performance when being arranged in a hand-portable telephone located in free space. When the telephone is moved to a talk position, the influence of the user lowers the resonance frequency. In order to compensate for the presence of the user, the switch 49 is opened, reducing the electrical length of the connected antenna structure and thus increasing the resonance frequency. This increase, with an appropriate design of the antenna structure 35 and the switching device 36, will compensate for the reduction as introduced when the telephone is moved from free space to talk position.

The same antenna structure 35 and switching device 36 may also be used for switching between two different frequency bands such as GSM900 and GSM1800. For instance, if an antenna configuration state, which includes antenna elements 50–53 connected to the feed point 55 (switches 37 and 46–48 closed and remaining switches opened), is adapted to suit the GSM900 frequency band, switching to the GSM1800 frequency band may be effectuated by simply opening the switch 47. The opening of the switch 47 reduces the electrical length of the presently connected antenna structure, i.e., elements 50 and 51, to approximately half the previous length, implying that the resonance frequency is approximately doubled, which would be suitable for the GSM1800 frequency band.

Figure 3:
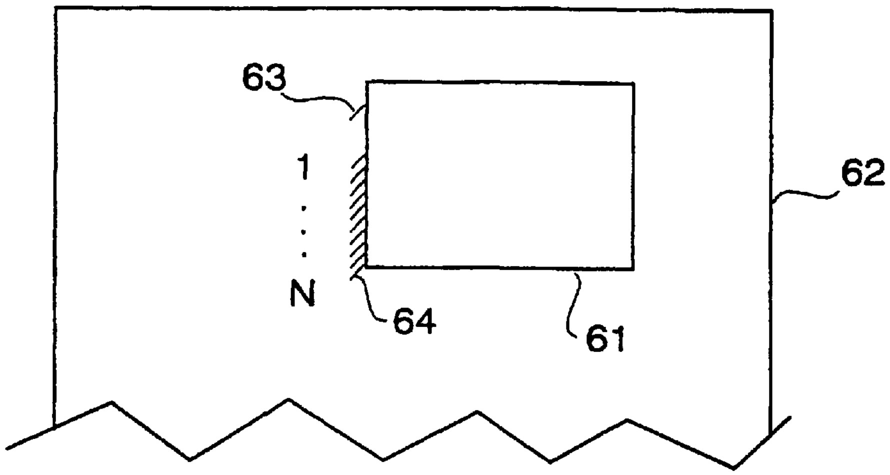
FIG. 3 schematically illustrates a receiving or transmitting antenna structure and a switching device for selectively grounding the receiving antenna structure at a variety of different points as part of an antenna device according to the present invention.

Impedance (FIG. 3)

Instead of tuning a detuned antenna, an adaptive impedance matching, which involves letting the resonance frequency be slightly shifted and compensate this detuning by means of matching, can be performed.

An antenna structure can have feed points at locations. Each location has a different ratio between the E and H fields, resulting in different input impedances. This phenomenon can be exploited by switching the feed point, provided that the feed point switching has little influence on the rest of the antenna structure. When the antenna experiences detuning due to the presence of the user (or other object), the antenna can be matched to the feed line impedance by altering, for example, the feed point of the antenna structure. In a similar manner, RF grounding points can be altered.

FIG. 3 schematically shows an example of such an implementation of an antenna structure 61 that can be selectively grounded at a number of different points spaced apart from each other. Antenna structure 61 is in the illustrated case a planar inverted F antenna (PIFA) mounted on a PCB 62 of a communication device. The antenna structure 61 has a feed line 63 and N different spaced ground connections 64. By switching from one ground connection to another, the impedance of the antenna structure 61 is slightly altered.

Moreover, switching in/out parasitic antenna elements can produce impedance matching, since the mutual coupling from the parasitic antenna element to the active antenna element produces a mutual impedance, which adds to the input impedance of the active antenna element.

Other typical usage positions in addition to FS and TP can be defined, such as waist position, pocket position, and on a steel table. Each case may have a typical tuning/matching, so that only a limited number of points need to be switched through. If outer limits for the detuning of the antenna elements can be found, the range of adaptive tuning/matching that needs to be covered by the antenna device can be estimated. One implementation is to define a number of antenna configuration states that cover the tuning/impedance matching range. There can be equal or unequal impedance difference between each different antenna configuration state.

Radiation Pattern

The radiation pattern of a wireless terminal is affected by the presence of a user or other object in its near-field area. Loss-introducing material will not only alter the radiation pattern, but also introduce loss in radiated power due to absorption. This problem can be reduced if the radiation pattern of the terminal is adaptively controlled. The radiation pattern (near-field) can be directed mainly away from the loss-introducing object, which will reduce the overall losses.

A change in radiation pattern requires the currents producing the electromagnetic radiation be altered. Generally, for a small device (e.g., a hand-portable telephone), there need to be quite large changes in the antenna structure to produce altered currents, especially for the lower frequency bands. However, this can be done by switching to another antenna type producing different radiation pattern, or to another antenna structure at another position/side of the PCB of the communication device.

Another way may be to switch from an antenna structure that interacts heavily with the PCB of the communication device (e.g., whip or patch antenna) to another antenna not doing so (e.g., loop antenna). This will change the radiating currents dramatically, since interaction with the PCB introduces large currents on the PCB (the PCB is used as main radiating structure).

An object in the near-field area of a device will alter the antenna input impedance. Therefore, VSWR may be a good indicator of when there are small losses. Small changes in VSWR as compared to VSWR of free space implies small losses due to nearby objects.

The discussion above concerns the antenna near-field and losses from objects in the near-field. However, in a general case, one could be able to direct a main beam in the far-field pattern in a favorable direction producing good signal conditions.

Figure 4:
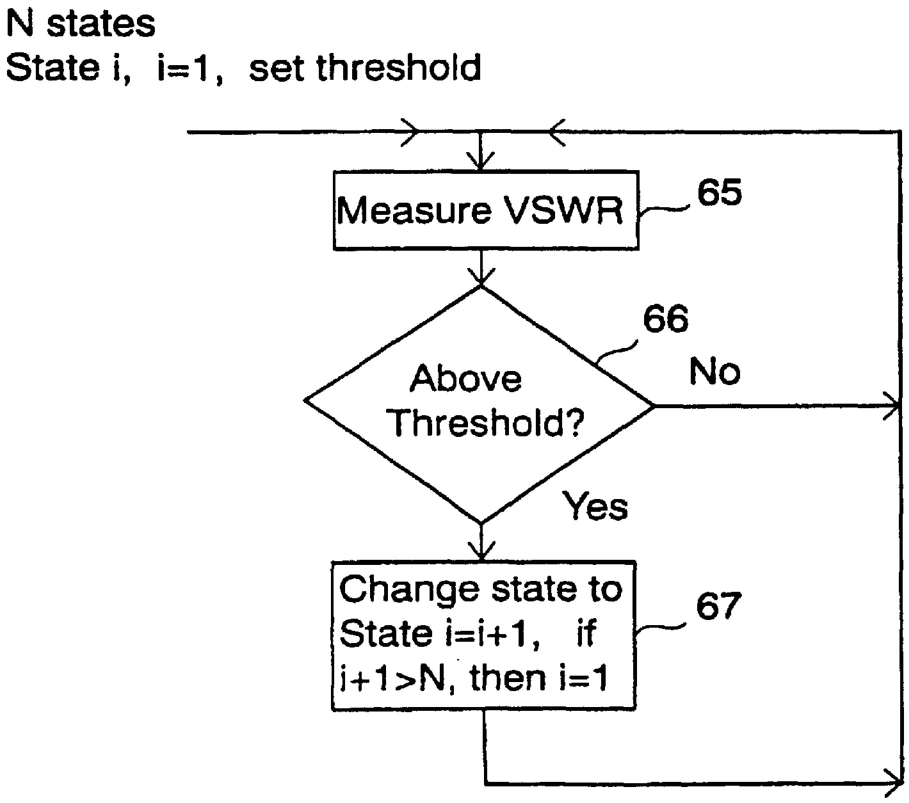
FIG. 4 is a flow diagram of an example of a switch-and-stay algorithm for controlling a switching device of an inventive antenna device.
Figure 5:
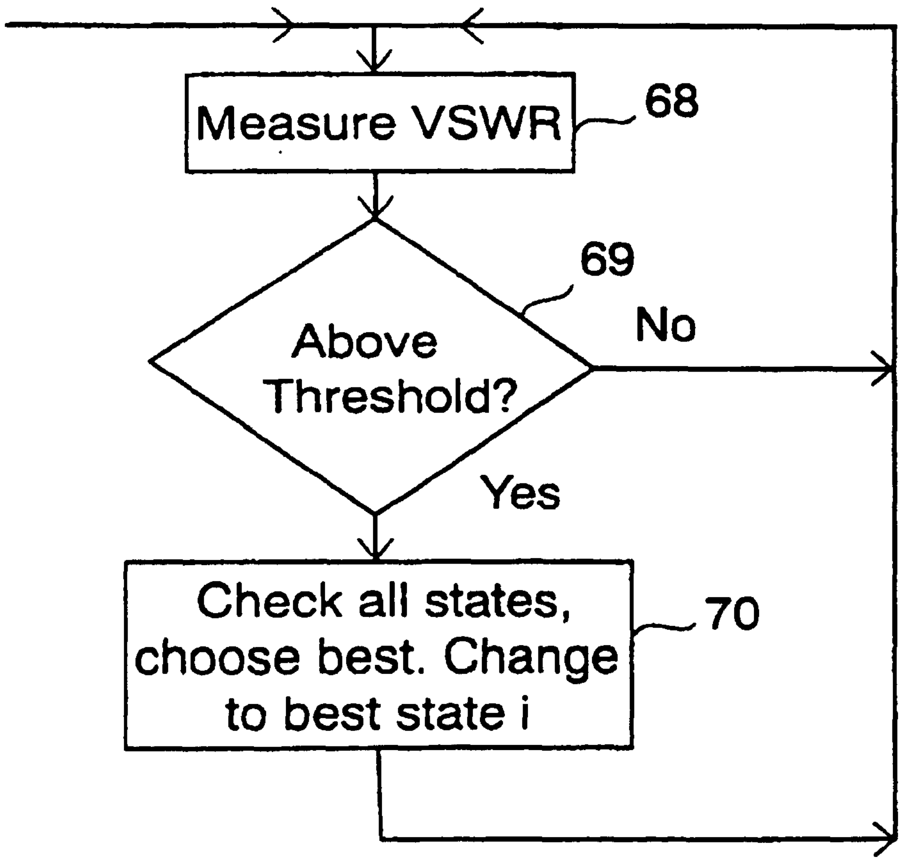
FIG. 5 is a flow diagram of an alternative example of an algorithm for controlling a switching device of an inventive antenna device.
Figure 6:
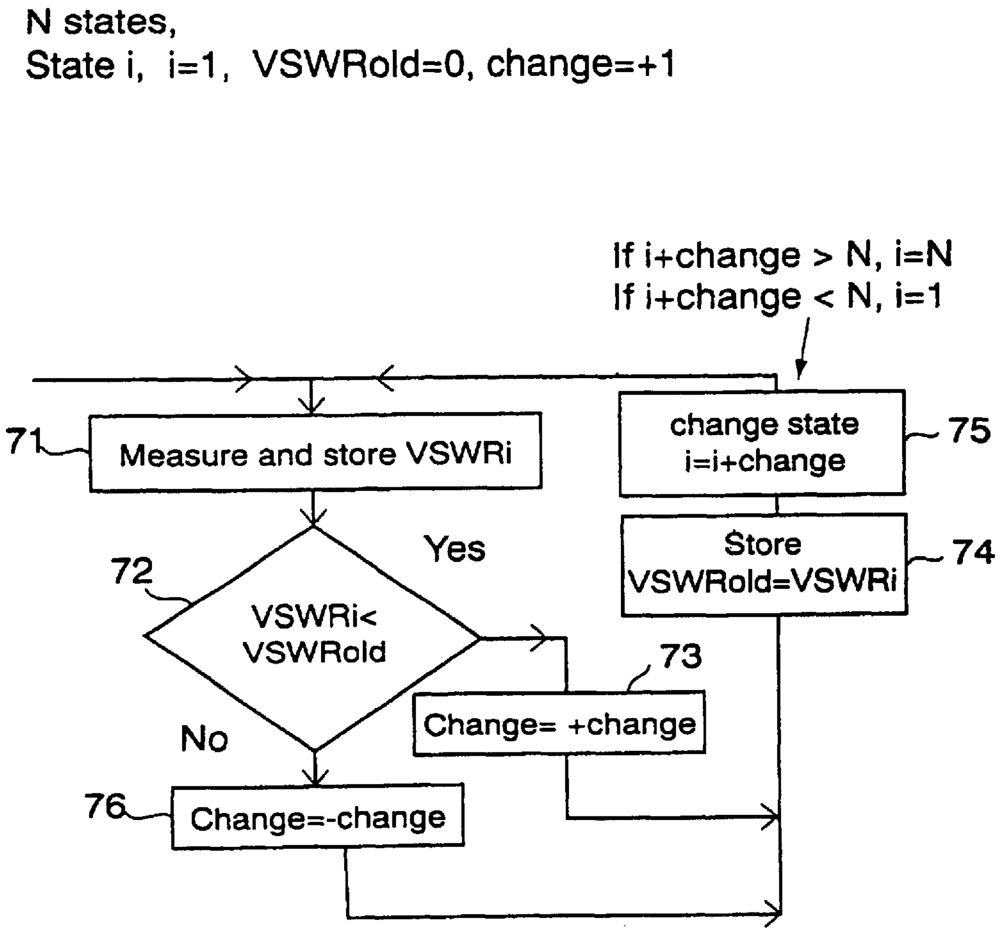
FIG. 6 is a flow diagram of a further alternative example of an algorithm for controlling a switching device of an inventive antenna device.

Algorithms (FIGS. 4–6)

The received measured operation parameters are processed in some kind of algorithm, which controls the state of the switches. All described algorithms will be of trial-and-error type, since there is no knowledge about the new state until it has been reached.

Below, with reference to FIGS. 4–6, some examples of algorithms for controlling the antenna are depicted. A combination of the first and second measured operation parameters, preferably a combination of VSWR and any of BER, (C/N) (C/I) and RSSI, may be used as an input, or alternatively, multiple algorithms are run in parallel and only one parameter is used in each algorithm. For simplicity the VSWR parameter will be used in the discussion below and in FIGS. 4–6. It shall, however be clear that it may be replaced by any other suitable parameter, or combination of parameters. In the latter case the term "measure" in FIGS. 4–6 should be read as "measure parameters and derive combination parameter".

The simplest algorithm is probably a switch-and-stay algorithm shown in the flow diagram of FIG. 4. Here switching is performed between predefined states i=1, . . . , N (e.g., N=2, one state being optimized for FS and the other state being optimized for TP). A state i=1 is initially chosen, whereafter, in a step 65, the VSWR is measured. The measured VSWR is then, in a step 66, compared with a predefined limit (the threshold value). If this threshold is not exceeded, the algorithm returns to step 65. If the threshold is exceeded, switching to a new state i=i+1 is performed. If i+1 exceeds N, switching is performed to state 1. After this step, the algorithm returns to step 65. There may be a time delay to prevent switching on a too fast time scale.

Using such an algorithm, each state 1, . . . , N is used until the measured operation parameter values exceeds the predefined limit. When this occurs, the algorithm steps through the predefined states until a state is reached, which has an operation parameter value below the threshold. Both the transmitter and receiver antenna structures can be switched at the same time. An arbitrary number of states may be defined, enabling switching to be performed between a manifold of states.

Another example is a more advanced switch-and-stay algorithm shown in the flow diagram of FIG. 5. In the same way as previous algorithm, N states are predefined, and a state i=1 is initially chosen, whereafter, in a step 68, the VSWR is measured, and, in a step 69, compared with the threshold value. If the threshold is not exceeded the algorithm is returns to step 68. If the threshold is exceeded, the algorithm proceeds to step 69, wherein all states are switched through and VSWR is measured for each state. All VSWR's are compared and the state with lowest VSWR is chosen.

Step 70 may look like:

```
for i=1:N
    switch to State i
    measure VSWR(i)
    store VSWR(i)
switch to State of lowest VSWR.
```

Finally the algorithm is returned to step 68. Note that this algorithm may require quite fast switching and measuring of the operation parameter, since all states have to be switched through in step 70. Hence, VSWR may be a better choice than BER for this algorithm.

A further alternative algorithm particularly suited for an antenna structure having a manifold of predefined antenna configuration states, which may be arranged so that two adjacent states have radiating properties that deviates only slightly is shown in FIG. 6. N states are predefined, and initially a state i=1 is chosen, a parameter VSWRold is set to zero, and a variable "change" is set to +1. In a first step 71 VSWRi (VSWR of state i) is measured and stored, whereafter in a step 72 the VSWRi is compared with VSWRold. If, VSWRi<VSWRold, the algorithm proceeds to step 73, wherein a variable "change" is set to +change (this step is not really necessary). Steps 74 and 75 follow, wherein VSWRold is set to present VSWR, i.e. VSWRi, and the antenna configuration state is changed to i+"change", i.e. i=i+change, respectively. The algorithm is then returned to step 71. If, VSWRi>VSWRold, the algorithm proceeds to step 76, wherein the variable "change" is set to −change. Next, the algorithm continues to steps 74 and 75. Note that in this case the algorithm changes "direction".

It is important to use a time delay to run the loops (71, 72, 73, 74, 75, 71 and 71, 72, 76, 74, 75, 71, respectively) only at specific time steps, as the switched state is changed at every loop turn. At step 72 a present state (VSWRi) is compared with the previous one (VSWRold). If the VSWR is better than the previous state, a further change of state in the same "direction" is performed. When an optimum is reached, the antenna configuration state as used will typically oscillate between two adjacent states at every time step. When end states 1 and N, repectively, are reached, the algorithm may not continue further to switch to states N and 1, respectively, but stays preferably at the end states until it switches to states 2 and N−1, respectively.

The algorithm assumes relatively small differences between two adjacent states, and that the antenna configuration states are arranged so that the rate of changes between each state is roughly equal. This means that between each state there is a similar quantity of change in, for example, resonance frequency. For example, small changes in the separation between feed and ground connections at a PIFA antenna structure would suit this algorithm perfectly, see FIG. 3.

In all described algorithms, it may be necessary to perform the switching only in specific time intervals adapted to the operation of the radio device.

As a further alternative, the control device 22 of FIG. 1 may hold a look-up table with absolute or relative voltage standing wave ratio (VSWR) ranges, of which each is associated with a respective antenna configuration state. Such a provision would enable the control device 20 to refer to the look-up table for finding an appropriate antenna configuration state given a measured VSWR value, and adjust the switching device 14 to the appropriate antenna configuration state.

Further Antenna Configurations (FIGS. 7*a–f*)

Next, with reference to FIGS. 7*a–f*, various examples of arrangements of antenna structures and switching devices for selectively connecting and disconnecting the antenna structure as part of antenna module 1 according to the present invention will briefly be described.

Figure 7A:
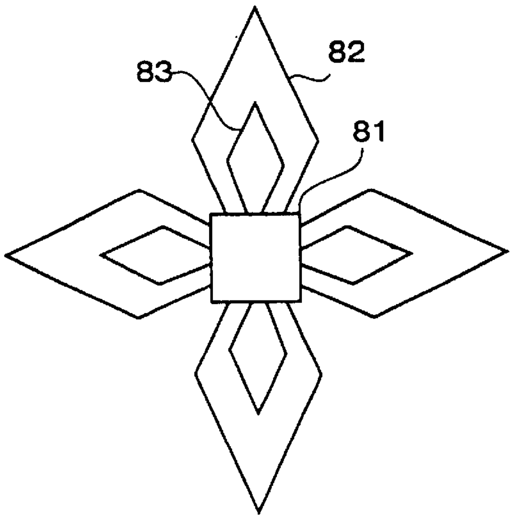
FIGS. 7*a*–7*f* schematically illustrate receiving or transmitting antenna elements and a switching device for selectively connecting and disconnecting the receiving antenna elements as part of an antenna module according to yet a further embodiment of the present invention.

FIG. 7*a* shows an antenna structure pattern arranged around a switching device or unit 81. The antenna structure includes receiving antenna elements, here in the form of four loop-shaped antenna elements 82. A loop-shaped parasitic antenna element 83 is formed within each of the loop-shaped antenna elements 82. The switching unit 81 includes a matrix of electrically controllable switches (not shown) arranged for connecting and disconnecting antenna elements 82 and 83. The switches may be PIN diode switches, GaAs field effect transistors (FET), or microelectromechanical system (MEMS) switches. The switching unit 81 can connect the loop-shaped antenna elements 82 in parallel or in series with each other, or some elements can be connected in series and some in parallel. Further, one or more elements can be completely disconnected or connected to ground (not shown).

Figure 7B:
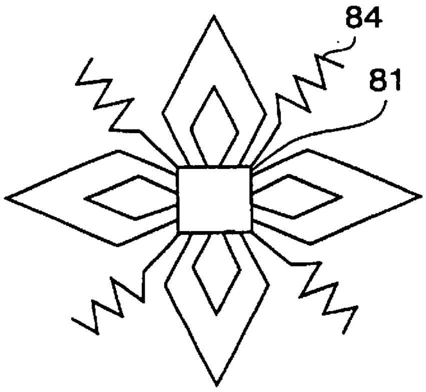

FIG. 7*b* shows an alternative antenna structure including all the antenna elements of FIG. 7*a* and further includes a meander-shaped antenna element 84 between each pair of loop-shaped elements 82, 83. One or more of the meander-shaped antenna elements 84 can be used separately or in any combination with the loop antenna elements.

Figure 7C:
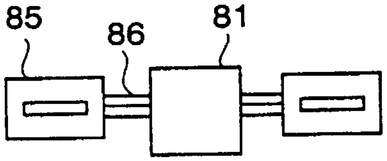
Figure 7D:
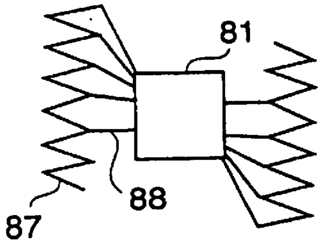
Figure 7E:
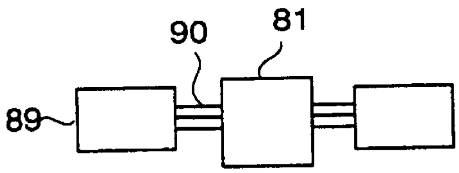

FIG. 7*c-e* show antenna structures including two slot antenna elements 85, two meander-shaped antenna elements 87, and two patch antenna elements 89, repectively, connected to the switching device 81. Each antenna element 85, 87, 89 may be fed at alternative spaced feed connections 86, 88, 90.

Figure 7F:
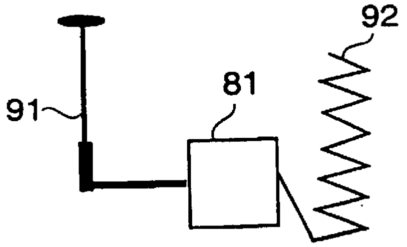

Finally, FIG. 7*f* shows an antenna structure including a whip antenna 91 and a meander-shaped antenna element 92 connected to the switching device 81.

It will be obvious that the invention may be varied in a plurality of ways. Such variations are not to be regarded as a departure from the scope of the invention. All such modifications as would be obvious to one skilled in the art are intended to be included within the scope of the appended claims.

What is claimed is:

1. An antenna device for transmitting and receiving radio frequency waves, installable in a communication device, and comprising:

an antenna structure switchable between a plurality of antenna configuration states, each antenna configuration state being distinguished by a set of radiation parameters;

a switching device which selectively switches said antenna structure between said plurality of antenna configuration states;

a first receiver which receives a first measured operation parameter indicative of quality of transmission of radio frequency waves by said antenna structure;

a second receiver which receives a second measured operation parameter indicative of quality of reception of radio frequency waves by said antenna structure; and a control device which controls said switching device, and thus selective switching of said antenna structure between said plurality of antenna configuration states, in accordance with said received first and second measured operation parameters, so as to improve quality of at least one of transmission and reception of the antenna structure.

2. The antenna device as claimed in claim 1, wherein said control device, at installation of said antenna device in a particular model of communication device, controls said switching device to switch between said plurality of antenna configuration states, in accordance with said received first and second measured operation parameters, so as to adapt said antenna device to suit said particular model of communication device.

3. The antenna device as claimed in claim 1, wherein said first and second receivers respectively receive the first and second measured operation parameters repeatedly.

4. The antenna device as claimed in claim 3, wherein said control device, during use of said antenna device in the communication device, controls said switching device to switch between said plurality of antenna configuration states, in accordance with said repeatedly received first and second measured operation parameters, so as to dynamically adapt said antenna device to a close-by environment of the communication device.

5. The antenna device as claimed in claim 1, wherein each of said plurality of antenna configuration states is adapted for use of the antenna device in the communication device in a respective predefined operation environment.

6. The antenna device as claimed in claim 5, wherein a first antenna configuration state of said plurality of antenna configuration states is adapted for use of the antenna device in the communication device in free space and a second antenna configuration state of said plurality of antenna configuration states is adapted for use of the antenna device in the communication device in a talk position.

7. The antenna device as claimed in claim 6, wherein a third antenna configuration state of said plurality of antenna configuration states is adapted for use of the antenna device in the communication device in a waist position.

8. The antenna device as claimed in claim 7, wherein a fourth antenna configuration state of said plurality of antenna configuration states is adapted for use of the antenna device in a radio communication device in a pocket position.

9. The antenna device as claimed in claim 1, wherein said antenna device is arranged for switching frequency bands in accordance with said received first and second measured operation parameters.

10. The antenna device as claimed in claim 1, wherein said antenna device is arranged for connection or disconnection of diversity functionality, in accordance with said received first and second measured operation parameters.

11. The antenna device as claimed in claim 1, wherein said control device controls said switching device to selectively switch the antenna structure between said plurality of antenna configuration states, in accordance with at least one of said received first and second measured operation parameters, bypassing a respective threshold value.

12. The antenna device as claimed in claim 1, wherein said control device, in accordance with at least one of said received first and second measured operation parameters bypassing a respective threshold value, controls said switching device to selectively switch the antenna structure through said plurality of antenna configuration states;

said first and second receivers receiving a respective first and second measured operation parameter for each antenna configuration state; and said control device further controls the switching device to selectively switch the antenna structure to an antenna configuration state with an optimum set of operation parameters.

13. The antenna device as claimed in claim 1, wherein said control device compares at least one of said received first and second measured operation parameters with a corresponding previously received at least one of first and second measured operation parameters, and switches the antenna structure in accordance with the comparison.

14. The antenna device as claimed in claim 1, wherein said control device includes a look-up table with combinations of received first and second measured operation parameter ranges, each combination being associated with a respective antenna configuration state, said control device adjusting said switching device to the respective antenna configuration state in accordance with said look-up table.

15. The antenna device as claimed in claim 1, wherein the plurality of antenna configuration states comprise different numbers of connected antenna elements.

16. The antenna device as claimed in claim 1, wherein the plurality of antenna configuration states comprise differently arranged feed connections.

17. The antenna device as claimed in claim 1, wherein the plurality of antenna configuration states comprise differently arranged ground connections.

18. The antenna device as claimed in claim 1, wherein said first measured operation parameter is a measure representing a reflection coefficient of the communication device and said second measured operation parameter is a measure of a received signal strength of the communication device.

19. The antenna device as claimed in claim 18, wherein said antenna device comprises a device which measures the reflection coefficient and sends a measured value of the reflection coefficient to the first receiver.

20. The antenna device as claimed in claim 18, wherein said antenna device comprises a device which measures the received signal strength and sends a measured value of the received signal strength to the second receiver.

21. The antenna device as claimed in claim 1, wherein said first and second receivers are provided as a single receiving element.

22. The antenna device as claimed in claim 1, wherein said control device comprises a central processing unit and a memory for storing antenna configuration data.

23. The antenna device as claimed in claim 1, wherein said switching device comprises a microelectromechanical system (MEMS) switch device.

24. The antenna device as claimed in claim 1, wherein said antenna structure comprises a switchable antenna element having at least one of meander, loop, slot, patch, whip, helical, spiral, and fractal configurations.

25. The antenna device as claimed in claim 1, wherein the antenna structure comprises a transmitting antenna structure and a receiving antenna structure; and said switching device comprises a transmitter switching device and a receiver switching device, said transmitting antenna structure and said transmitter switching device being arranged in a transmitter antenna device, and said receiving antenna structure and said receiver switching device being arranged in a receiver antenna device, wherein said transmitter antenna device and said receiver antenna device are controllable independently of each other by said control device.

26. A communication device comprising the antenna device of claim 1.

27. The antenna device as claimed in claim 1, wherein said set of radiation parameters includes at least one of resonance frequency, impedance, radiation pattern, polarization and bandwidth.

28. The antenna device as claimed in claim 1, wherein said antenna structure comprises a plurality of antenna elements capable of being connected to and disconnected from each other, and multiple ones of said plurality of antenna elements are connected to each other in each of said plurality of antenna configuration states.

29. The antenna device as claimed in claim 1, comprising at least three of said antenna configuration states.

30. The antenna device as claimed in claim 1, wherein said antenna structure has different electrical lengths and resonance frequencies in different ones of said antenna configuration states.

31. The antenna device as claimed in claim 1, wherein said antenna structure comprises an antenna element and a plurality of feed connectors and/or ground connectors connectable to and disconnectable from said antenna element, and different ones of said feed connectors and/or ground connectors are connected to said antenna element in different ones of said antenna configuration states.

32. A method for transmitting or receiving radio frequency waves in an antenna device installable in a communication device, the method comprising:

selectively switching an antenna structure switchable between a plurality of antenna configuration states, each antenna configuration state being distinguished by a set of radiation parameters;

receiving a first measured operation parameter indicative of quality of transmission of radio frequency waves by said antenna structure;

receiving a second measured operation parameter indicative of quality of reception of radio frequency waves by said antenna structure; and controlling said selectively switching of the antenna structure between said plurality of antenna configuration states, in accordance with said received first and second measured operation parameters, so as to improve quality of at least one of transmission and reception.

33. The method as claimed in claim 32, wherein said controlling includes, at installation of the antenna device in a particular model of communication device, controlling said selectively switching to switch to an antenna configuration state in accordance with said received first and second measured operation parameters, so as to adapt the antenna device to suit the particular model of communication device.

34. The method as claimed in claim 32, wherein said receivings include repeatedly receiving the first and second measured operation parameters.

35. The method as claimed in claim 34, wherein said controlling includes, during use of the antenna device in the communication device, controlling said selectively switching between said plurality of antenna configuration states, in accordance with said repeatedly received first and second measured operation parameters, so as to dynamically adapt the antenna device to a close-by environment of the communication device.

36. The method as claimed in claim 32, further comprising adapting each of said plurality of antenna configuration states for use of the antenna device in the communication device in a respective predefined operation environment.

37. The method as claimed in claim 32, further comprising switching frequency bands in dependence on said received first and second measured operation parameters.

38. The method as claimed in claim 32, further comprising connecting or disconnecting diversity functionality, in dependence on said received first and second measured operation parameters.

39. The method as claimed in claim 32, wherein said controlling includes controlling said selectively switching the antenna structure between said plurality of antenna configuration states, in accordance with at least one of first and second measured operation parameters, bypassing a respective threshold value.

40. The method as claimed in claim 32, further comprising:

controlling said selectively switching to switch the antenna structure through said plurality of antenna configuration states, in dependence on the at least one of the first and second measured operation parameters, bypassing a respective threshold value;

receiving a respective first and second measured operation parameter for each antenna configuration state; and controlling said selectively switching to switch the antenna structure to an optimum antenna configuration state.

41. The method as claimed in claim 32, further comprising comparing at least one of received first and second measured operation parameters with corresponding at least one of previously received first and second measured operation parameters, and controlling said selectively switching the antenna structure in accordance with the comparison.

42. The method as claimed in claim 32, further comprising storing a look-up table with combinations of received first and second measured operation parameter ranges, each combination being associated with a respective antenna configuration state, and referring to said look-up table for adjusting said selectively switching to the respective antenna configuration state.

43. The method as claimed in claim 32, wherein said set of radiation parameters includes at least one of resonance frequency, impedance, radiation pattern, polarization and bandwidth.

* * * * *